C. A. BRINLEY.
PULLEY.
APPLICATION FILED MAR. 16, 1911.
1,016,667.
Patented Feb. 6, 1912.
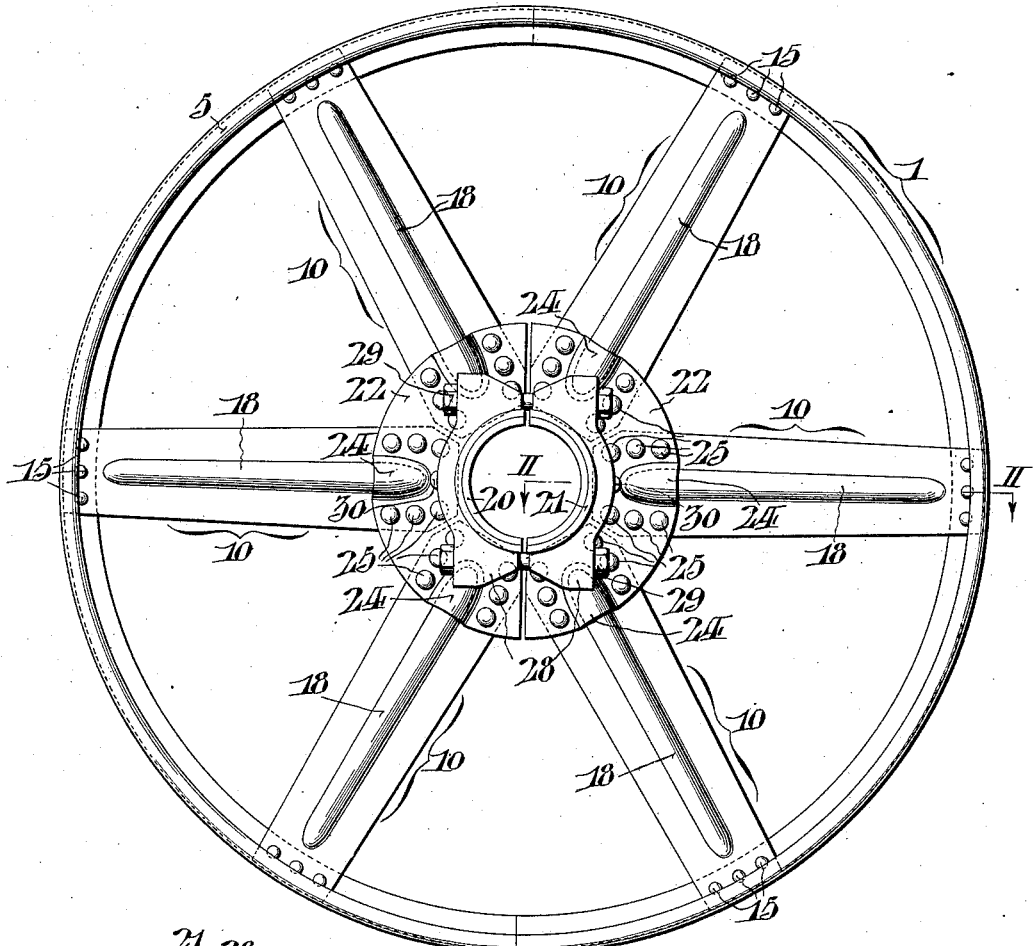
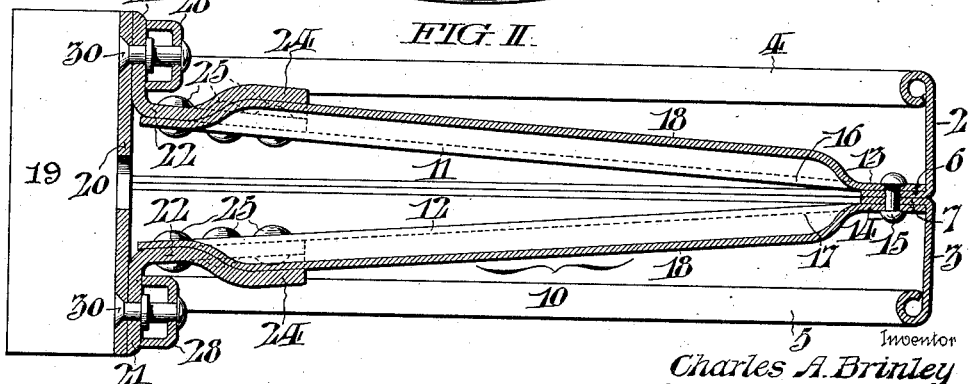

UNITED STATES PATENT OFFICE.

CHARLES A. BRINLEY, OF PHILADELPHIA, PENNSYLVANIA, ASSIGNOR TO THE AMERICAN PULLEY COMPANY, OF PHILADELPHIA, PENNSYLVANIA, A CORPORATION OF PENNSYLVANIA.

PULLEY.

1,016,667.

Specification of Letters Patent. Patented Feb. 6, 1912.

Application filed March 16, 1911. Serial No. 614,768.

*To all whom it may concern:*

Be it known that I, CHARLES A. BRINLEY, of Philadelphia, in the county of Philadelphia and State of Pennsylvania, have invented certain new and useful Improvements in Pulleys, whereof the following is a specification, reference being had to the accompanying drawings.

My invention has peculiar value in that class of pulleys which are built up from elements of pressed metal, such as steel, and in the accompanying drawings, I have shown it as embodied in a structure of that character, and in the particular form known as a "split pulley", that is to say, one in which the pulley is divided diametrically into two halves which are secured together at the region of the hub and of the rim. It is obviously, however, not limited to such modification.

Referring to the drawings, Figure I represents a side elevation of such pulley. Fig. II, is a partial transverse section thereof, on the line II, II, of Fig. I, and on an enlarged scale.

Referring to Fig. I, each half of the rim 1, of the pulley is composed of two similar bands of metal 2, and 3, respectively, whose external edges may be bent into beads such as 4, and 5, and whose meeting edges are provided with flanges 6, and 7, respectively, projecting radially inward, and affording means of attachment to the spokes 10. As said spokes are similar to one another in structure and in their relation to the hub, a description of one will suffice. Each spoke comprises a pair of elongated plates or spoke-pieces 11, and 12, respectively, which are counterparts of one another, but face in opposite directions with relation to the median plane of the pulley. At their outer extremities, these spoke-pieces converge as shown at 13, and 14, so as to closely embrace the flanges 6, and 7, of the rim, to which they are secured by means of rivets 15.

From the inner edges of the flanges 6, and 7, the general planes of the spoke-pieces diverge as indicated by the dotted lines at 16, and 17, to the region where their attachment to the hub element begins. The inner ends of those spoke-pieces which are upon the same side of the several spokes, lie wholly in the same general plane, without overlapping. Each spoke-piece is provided with a relatively deep corrugation 18, which runs longitudinally along its central portion.

The hub member 19, is divided into two similar parts, each one of which may be considered as a complete element. Each comprises a semi-circular hub-shell 20, upon which are mounted two semi-annular hub-ring portions, which face in opposite directions thereon. Although each of these comprises only one-half of the entire circumference of the hub element, it is convenient for purposes of nomenclature to term them "hub-rings". Each of these hub-rings comprises a semi-annular band 21, which fits snugly upon the exterior surface of the hub-shell 20, and an approximately radial flange 22, which projects outward in parallelism with the general plane of the inner ends of the adjacent spoke-pieces. At intervals which register with the inner ends of the corrugations 18, upon the spoke-pieces, the hub-ring flange 22, is provided with outwardly projecting pockets 24, into which the inner extremities of the corrugations 18, fit closely, as shown.

The inner end of each spoke-piece is secured directly to the flange of the hub-ring by means of rivets 25, preferably located symmetrically as shown, the adjacent edges of the spoke-pieces being beveled, as shown, so that they may be extended radially inward as far as possible, without overlapping. Clamping bands 28, adapted to receive the bolts 29, which secure the two halves of the hub together, embrace the flanges of the respective hub-rings and are secured by means of rivets 30.

The structure thus embodied affords great economy in manufacture, since the parts can be readily struck up in dies and are easy to assemble. Furthermore, the structure is wholly symmetrical and possesses great strength at the points where torsional strain is most felt.

I am aware that it is not new to construct a pulley with spokes whose inner extremities are bifurcated, so as to overlap portions of adjacent spokes, and to attach these bifurcated inner extremities to flanges connected with the hub. In such construction, however, the inner extremities of the overlapping parts do not lie in the same general plane, and consequently some of said parts are not attached directly against the flange of the hub-ring.

By my above described improvement the structure of the arms is greatly simplified and the symmetry of the pulley is enhanced, as the parts upon each side are flush with one another.

Having thus described my invention, I claim:—

In a pulley, the combination with a rim; of a plurality of spokes, each comprising a pair of spoke-pieces, converging at their outer extremities to a point of attachment to the rim; each of said spoke-pieces being provided with a longitudinal corrugation extending to a point near its inner extremity; a hub-shell; hub-rings carried by said shell, said hub-rings respectively comprising a band portion adapted for attachment to the shell and a flange having pockets adapted to receive the inner extremities of the corrugations upon the spoke-pieces; and means for securing the spoke-pieces to the rim and to the hub-rings respectively.

In testimony whereof, I have hereunto signed my name at Philadelphia, Pennsylvania, this ninth day of March 1911.

CHARLES A. BRINLEY.

Witnesses:
JAMES H. BELL,
E. L. FULLERTON.

---

Copies of this patent may be obtained for five cents each, by addressing the "Commissioner of Patents, Washington, D. C."